United States Patent
Wendte

(10) Patent No.: US 6,827,029 B1
(45) Date of Patent: Dec. 7, 2004

(54) METHOD AND APPARATUS FOR AUTOMATICALLY MAINTAINING SEED TRENCH DEPTH DURING SEED PLANTING OPERATIONS

(75) Inventor: Keith W. Wendte, Hinsdale, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/700,879

(22) Filed: Nov. 4, 2003

(51) Int. Cl.⁷ .................................................. A01C 7/20
(52) U.S. Cl. ....................................................... 111/185
(58) Field of Search ................................. 111/170, 174, 111/177, 176, 179, 183–185, 200, 900; 172/2–11; 221/211, 266, 264; 701/50

(56) References Cited

U.S. PATENT DOCUMENTS

| | | |
|---|---|---|
| 4,726,571 A | 2/1988 | Smith et al. |
| 6,109,193 A | 8/2000 | Crabb et al. |
| 6,389,999 B1 | 5/2002 | Duello |
| 6,401,638 B1 | 6/2002 | Crabb et al. |

Primary Examiner—Robert E Pezzuto
(74) Attorney, Agent, or Firm—Rebecca Henkel; Brant T. Maurer

(57) ABSTRACT

A planting unit is provided having a seed trench opener that forms a seed trench in a ground surface as the planting unit travels along the ground. A depth regulating member is provided that has a predetermined vertical position relative to the opener. The depth regulating member is operable to ride along the ground and thus predetermined the seed trench depth. A down pressure assembly is provided that maintains the depth regulating member in proper engagement with the ground.

32 Claims, 11 Drawing Sheets

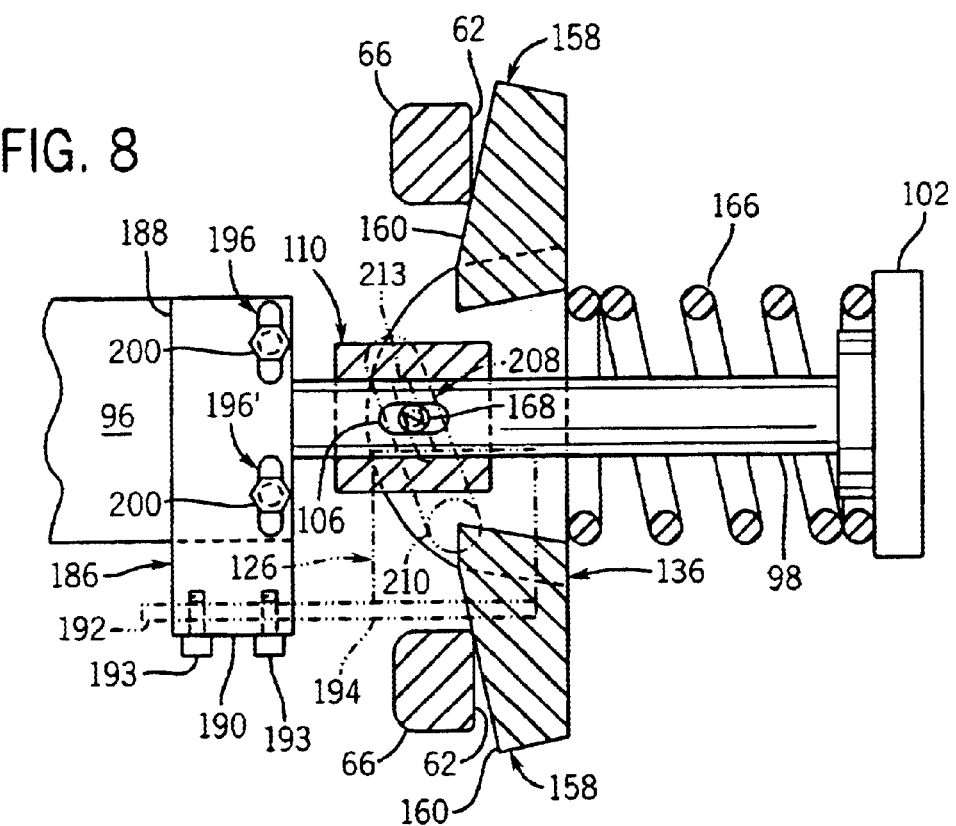
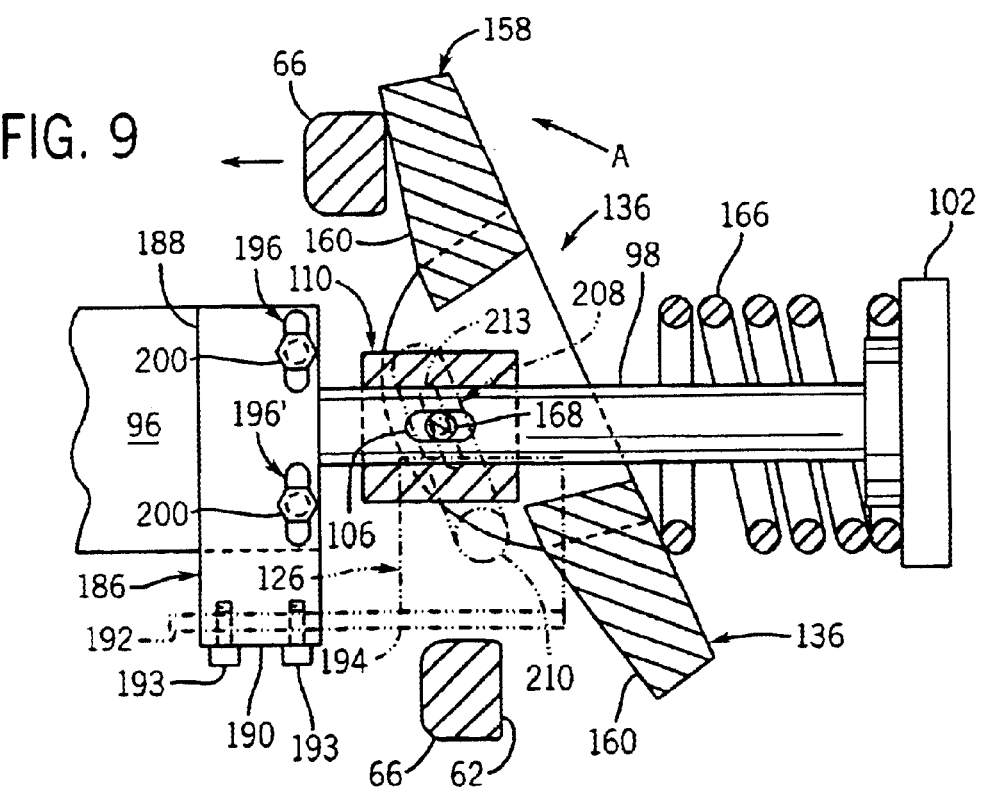

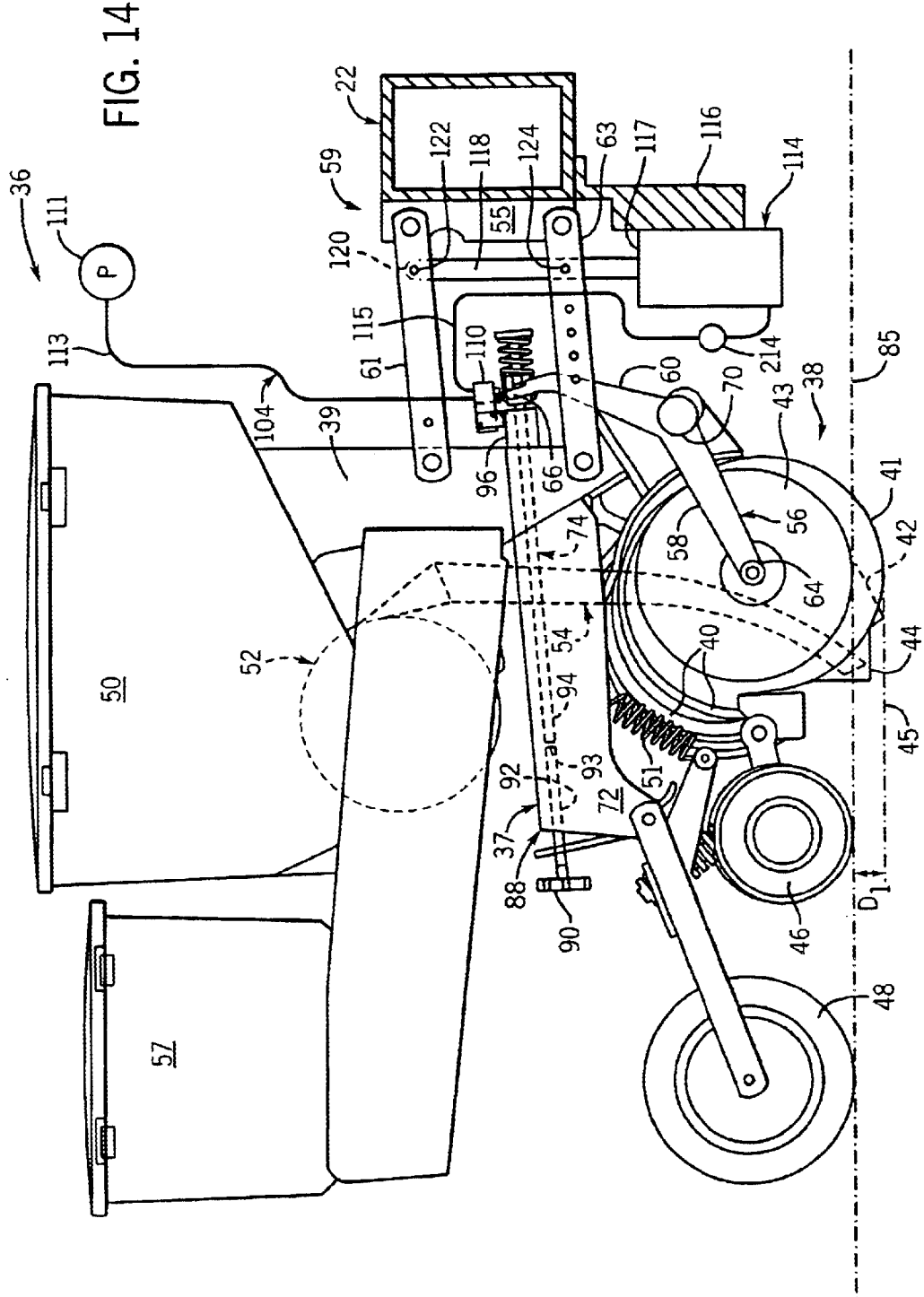

METHOD AND APPARATUS FOR AUTOMATICALLY MAINTAINING SEED TRENCH DEPTH DURING SEED PLANTING OPERATIONS

CROSS REFERENCE TO RELATED APPLICATIONS

None

STATEMENT REGARDING FEDERALLY SPONSORED RESEARCH OR DEVELOPMENT

None

BACKGROUND OF THE INVENTION

The present invention relates to seed planting assemblies in general, and in particular relates to a method and apparatus for selectively disengaging seed planting units of a seed planting assembly.

Seed planting units generally include a laterally extending tool bar that supports a plurality of parallel planting units (also known as row units). The tool bar is typically coupled to a tractor or like vehicle suitable for towing the planting assembly along a field that is to be seeded to a crop. Each planting unit includes a device for opening a seed trench in the ground as the tractor draws the tool bar across a field to be seeded. Each planting unit further includes a seed meter to dispense seeds at a controlled rate into a seed trench as the meter is advanced above and along the seed trench during operation. Generally, seeds are delivered to the metering assembly from a seed hopper located on the planting unit or, alternatively, from a smaller container fed from a centralized large hopper used to feed all or a portion of the planting units. Each planting unit further includes a closing assembly that moves soil at the sides of the seed trench to close the seed trench over the planted seeds. Adjacent planting units are laterally spaced a sufficient distance to form seed trenches that are spaced a corresponding distance apart that is suitable for the type of seed being planted.

It should be appreciated that a crop yield is maximized when all seeds emerge from the soil within a given timeframe relative to each other. Otherwise, if some seeds emerge later than others in a given row, the yield for that row can be substantially reduced. One known method for encouraging uniform seed emergence is to maintain the seed trench at a constant depth when performing seed planting operations. Seed trench depth is typically controlled by one or more gauge wheels that ride along the ground and have a predetermined vertical position relative to the seed trench opening device.

During operation, several factors can affect the depth of the seed trench, including, for instance, the soil type, pretillage applied to the soil, soil moisture, amount of residue covering the soil, residue moisture, previous crops, opener blade wear. These variables can change from field to field, and furthermore typically change within a single given field. Another factor which significantly affects the seed trench depth is the speed of the planting operation, it being appreciated that faster travel causes the opener blade to ride up in the ground, which decreases the seed trench depth.

Conventionally, uniform seed trench depth was attempted by including a mechanical spring member in planting units that delivers a downward force (down pressure) on the planting unit. The spring force can be increased or decreased to correspondingly increase or decrease the down pressure on the planting unit gauge wheels when the unit travels over hard and soft ground, respectively. The adjustment of down pressure, along with the gauge wheels, controls the depth of the seed trench-opening device, thereby maintaining the seed trench at a relatively constant depth during operation. It should be appreciated that an insufficient amount of down pressure causes the vertical position of the seed trench-opening device to vary, while an excessive amount of down pressure unnecessarily forces the gauge wheels to compact the ground adjacent the seed trench, thereby retarding growth in the row. While manual adjustment mechanisms proved adequate to adjust down pressure, they required the operator to stop the tractor, exit the vehicle, and adjust the downpressure on each individual planting unit. This method incorporates several disadvantages, including operator inconvenience and the potential for operator error.

Accordingly, automatic down pressure adjustment systems have been introduced that include a strain gauge for measuring the forces on the row unit gauge wheels. The strain gauge provides an output to a microprocessor which, based on the measured strain, provides a signal to an actuator that increases or decreases the applied down pressure, depending on the measurement of the strain gauge. Strain gauge-based down pressure systems, while alleviating some of the inconveniences imposed by the manual system, nonetheless are themselves inconvenient to operate. For instance, strain gauges must be constantly calibrated, and are subject to error. Furthermore, the inclusion of a microprocessor adds cost and complexity to a mechanical system.

What is therefore needed is a simplified and more reliable method and apparatus for automatically adjusting the pressure acting on the planting unit during operation as the planting unit travels between areas of hard and soft soil.

SUMMARY OF THE INVENTION

In accordance with one aspect of the present invention, a seed planting assembly includes a planting unit frame that is supported by a laterally extending support member. The planting unit frame carries a seed trench opening assembly operable to create a seed trench in a ground surface. The planting unit frame further carries a seed delivery assembly delivering seeds into the seed trench. The planting unit frame further carries a seed trench closing assembly operable to close the seed trench. A depth regulating member is provided having a vertical position relative to the seed trench opening assembly. The depth regulating member experiences an actual vertical force that controls ground surface engagement. A spring is supported by the support member and connected to the planting unit. The spring provides a variable spring force against the frame in response to variations in internal spring pressure. A pressurized fluid source is provided and operable to provide fluid to the spring. A valve links the fluid source to the spring. The valve is in mechanical communication with the seed trench opening assembly and enables fluid to flow in and out of the spring to correspondingly adjust the spring force when the actual vertical force differs from a desired vertical force.

The foregoing and other aspects of the invention will appear from the following description. In the description, references are made to the accompanying drawings which form a part hereof, and in which there is shown by way of illustration, and not limitation, a preferred embodiment of the invention. Such embodiment does not necessarily represent the full scope of the invention, however, and reference must therefore be made to the claims for interpreting the scope of the invention.

BRIEF DESCRIPTION OF THE DRAWINGS

Reference is hereby made to the following figures in which like reference numerals correspond to like elements throughout, and in which:

FIG. 8 is a sectional elevation view of the down pressure assembly taken through line 8—8 of FIG. 6 illustrating a neutral gauge wheel position;

FIG. 9 is a sectional side elevation view similar to FIG. 8, but illustrating an offset gauge wheel position;

FIG. 14 is a side elevation view of a planting unit similar to FIG. 2, but incorporating an automatic up pressure system constructed in accordance with an alternate embodiment of the invention.

DETAILED DESCRIPTION OF THE PREFERRED EMBODIMENT

Figure 1:
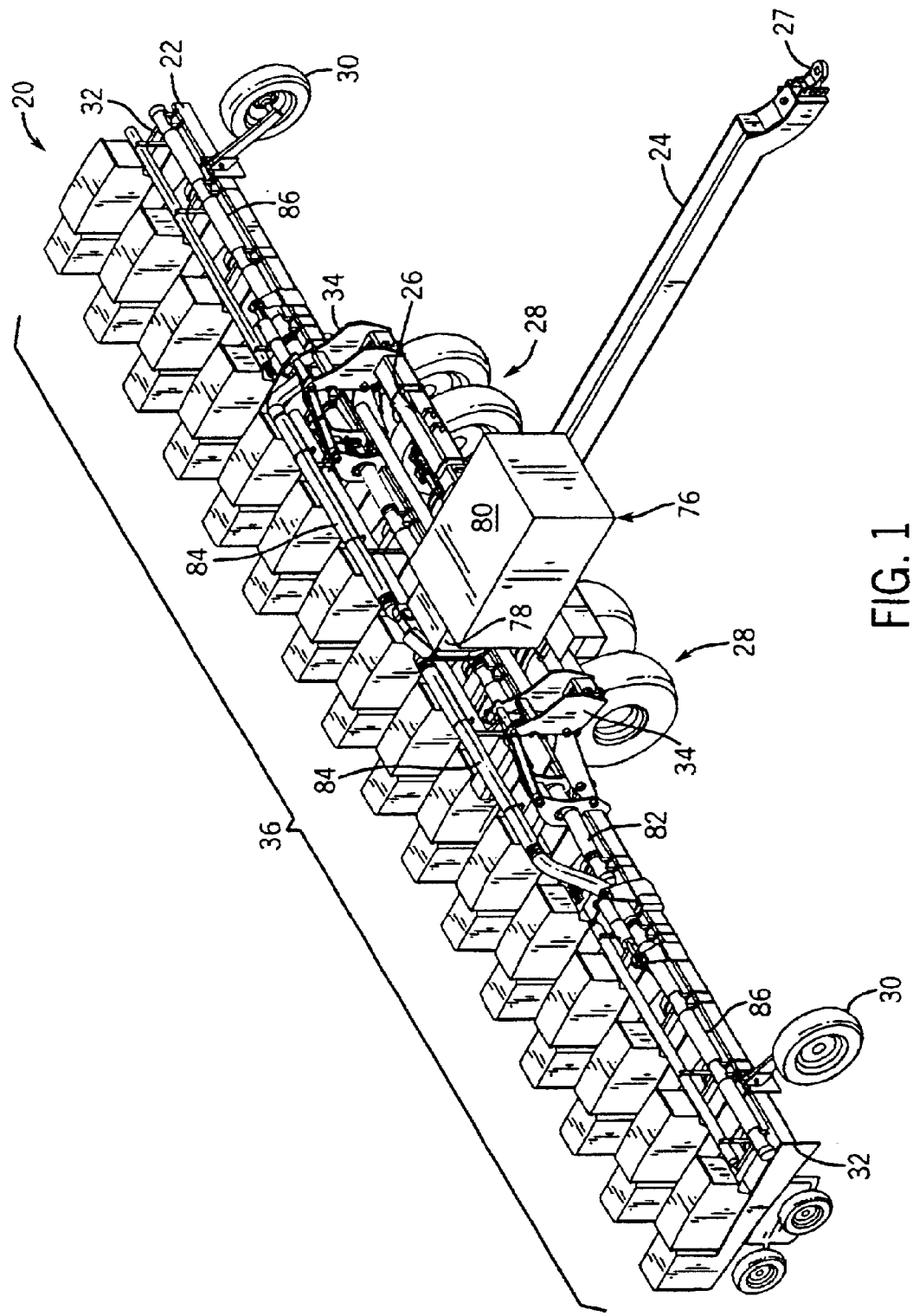
FIG. 1 is a schematic perspective view of a seed planting assembly supporting a plurality of seed planting units constructed in accordance with the preferred embodiment of the invention.

Referring to FIG. 1, a seed planting assembly 20 includes a laterally extending toolbar 22 connected at its middle to a forwardly extending tow bar 24. Tow bar 24 includes a connector 27 disposed at its longitudinally forward end and configured to mate with a corresponding hitch, or the like, of a towing tractor (not shown). Toolbar 22 is supported by a chassis 26 that is connected to tow bar 24 via a bracket assembly 34. Chassis 26 is supported on the ground by two pair of inner wheels 28 disposed on opposite sides of tow bar 24, and a pair of outer wheels 30 disposed proximal the opposing laterally outer ends 32 of toolbar 22.

A plurality of seed planting units (or row units) 36 extends longitudinally rearwardly from toolbar 22. In particular, referring also to FIG. 2, each planting unit 36 includes a frame 37 that is connected at its front end 39 to toolbar 22 via a mounting assembly 59. Mounting assembly includes a pair of upper support beams 61 (one illustrated) and a pair of lower support beams 63 (one illustrated) that are hingedly connected to frame 37 at one end, and to a mounting structure 55 at another end. Mounting structure 55 is, in turn, connected to toolbar 22. Support beams 61 and 63 thus enable planting unit 36 to be raised and lowered without changing the orientation of the planting unit.

As is well-known in the art, planting units 36 are mounted in a side-by-side (lateral) relation relative to each other along the toolbar 22. While sixteen such row units are illustrated in FIG. 1, the present invention contemplates that up to thirty-one row units can be assembled on a single toolbar 22 in accordance with the preferred embodiment. During operation, forward movement of the tractor causes row units 36 to ride along the ground, forming a plurality of seed trenches that receive seeds and are subsequently closed.

Figure 2:
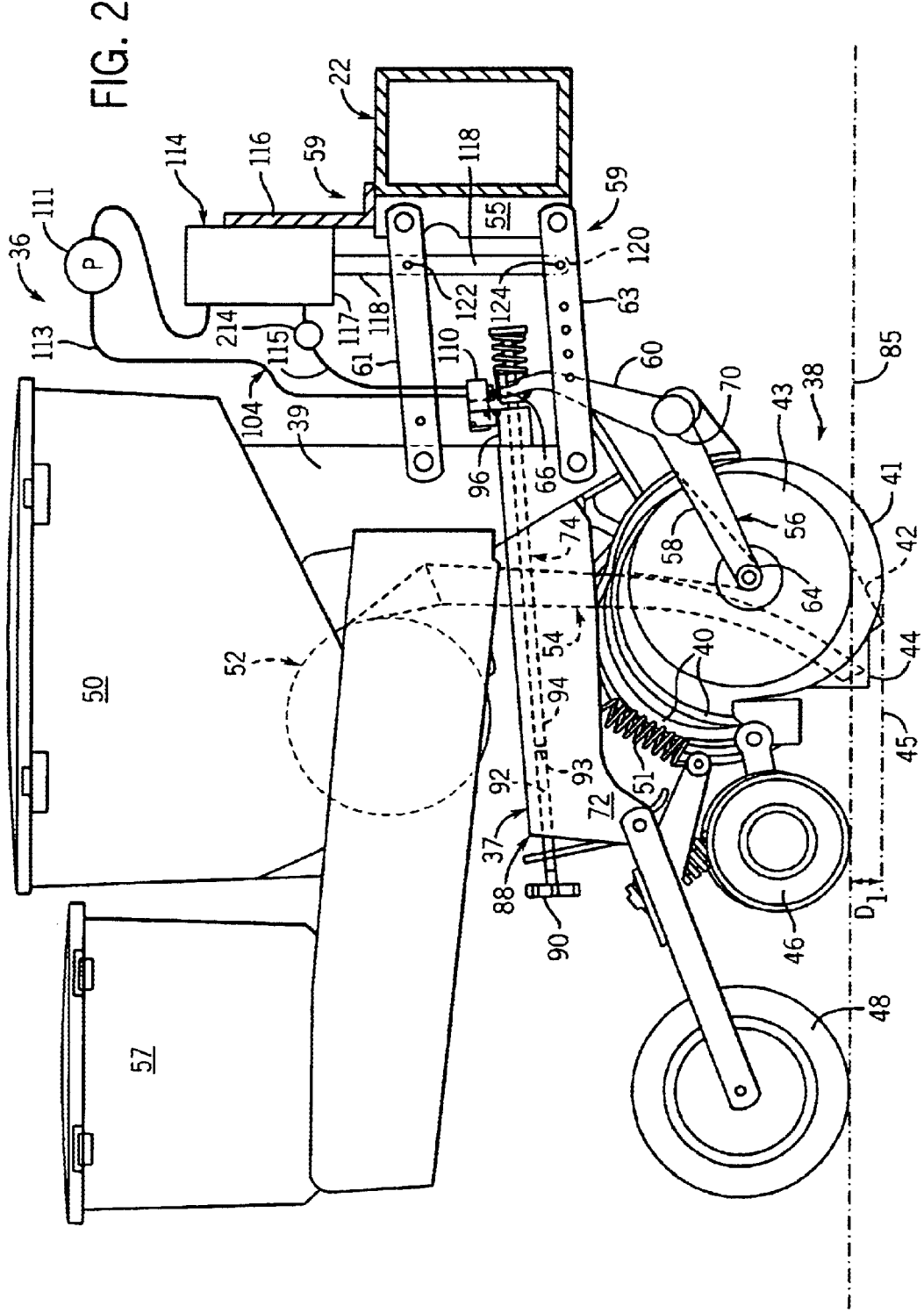
FIG. 2 is a side elevation view of a planting unit illustrated in FIG. 1 incorporating an automatic down pressure assembly constructed in accordance with the preferred embodiment, and further including a seed trench opening assembly creating a seed trench at a desired depth.

Referring to FIG. 2 in particular, each planting unit 36 preferably includes a conventional seed trench opening assembly 38, each of which including a pair of laterally spaced seed trench opener discs 40 that converge forwardly and downwardly to define a convergence point 41 that creates a seed trench 45 as planting unit 36 is dragged along the ground 85. As illustrated in FIG. 2, seed trench 45 has a depth D1, which is defined herein as a desired seed trench depth. A pair of gauge wheels 43 is provided that are spaced laterally outwardly on either side of opener discs 40. Gauge wheels 43 are rotatably mounted on a corresponding gauge wheel arm 56, and are suspended independently of opener discs 40.

Figure 3:
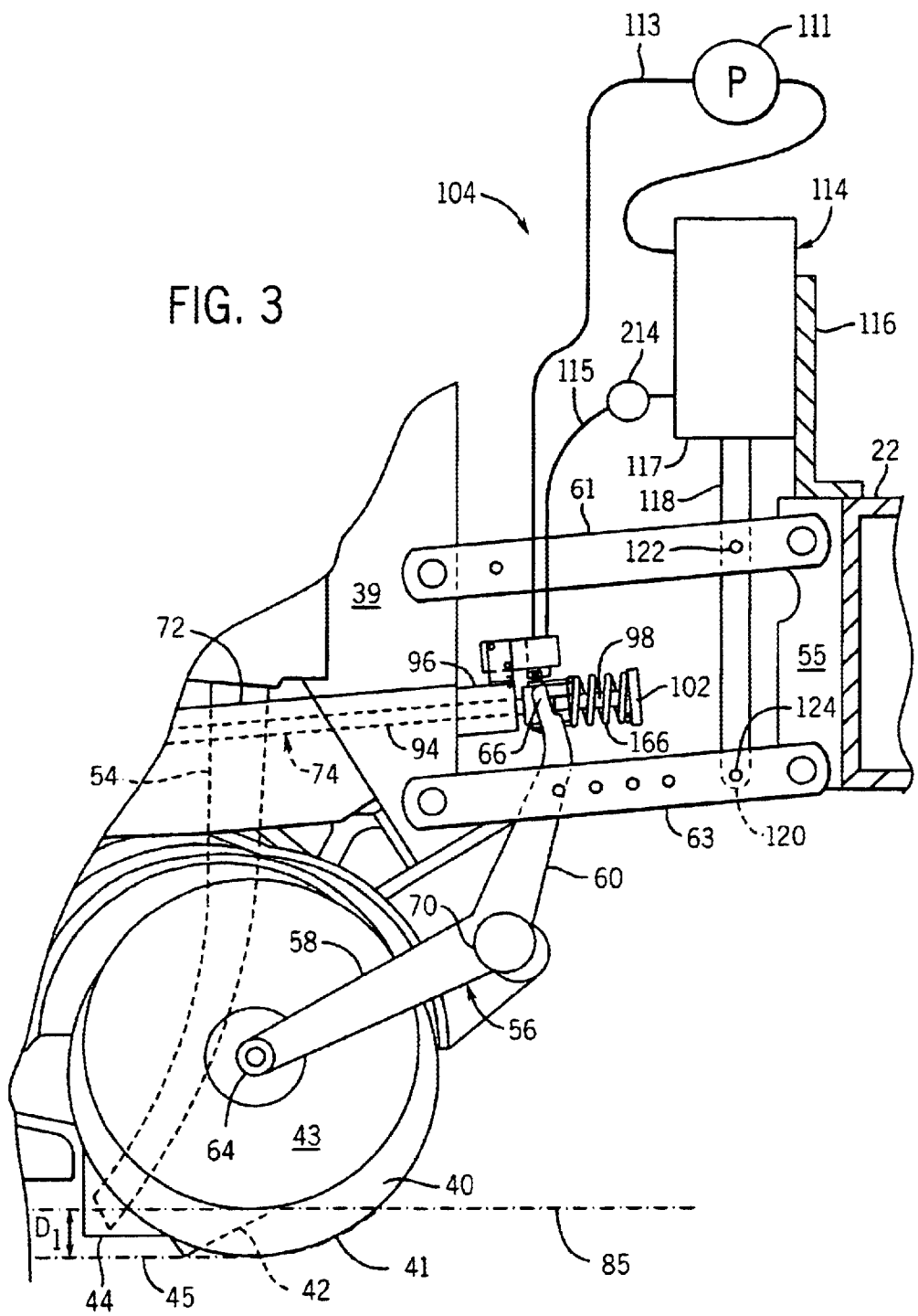
FIG. 3 is a side elevation view of the planting unit illustrated in FIG. 2 showing an enlarged view of the down pressure assembly and seed trench opening assembly.

Referring also to FIG. 3, each gauge wheel arm 56 includes a lower segment 58 having a lower end 64 that rotatably supports the corresponding gauge wheel 43. Gauge wheel arm 56 further includes an upper segment 60 defining an upper gauge wheel arm end 66. Upper segment 60 is integrally connected to lower segment 58 at an elbow 70 that defines a fixed angle between lower and upper segments 58 and 60. Elbow 70 is pivotally mounted onto frame 37. Vertical translation of gauge wheels 43 relative to frame 37 causes the corresponding gauge wheel arm 56 to pivot about elbow 70, thereby causing the upper end 66 to translate forwardly and rearwardly.

Referring once again to FIG. 2, each planting unit 36 further includes a seed trench firming point 42 disposed rearwardly from convergence point 41. An opener shoe 44 is disposed rearwardly from firming point 42. Opener shoe 44 and firming point 42 can be integrally connected to each other. Firming point 42 extends slightly downwardly with respect to opener shoe 44, and helps define the seed trench formed by opening discs 40. Alternatively, the planting unit 36 can be provided with a runner opener type, or any alternative opener apparatus, suitable for providing a seed trench in the ground as is appreciated by one having ordinary skill in the art. Planting unit 36 further includes a pair of spring-loaded seed trench closer discs 46 disposed rearwardly from opener shoe 44. A press wheel 48 is disposed rearwardly from closer discs 46, and rotates as planting unit 36 travels along ground 85. Press wheel 48 is biased against the ground 85 by a spring 51.

Planting unit 36 further includes a seed hopper 50 that provides storage for seed material that is to be gravitationally deposited into the seed trench that is formed as the seed trench opening assembly moves across the field during operation. It should be appreciated, however, that a hopper container, smaller than container 50, can alternatively be connected to a centralized bin or large hopper in a conventional manner. In the illustrated embodiment, seeds are delivered from hopper 50 to a seed metering assembly 52 that acts under vacuum pressure to deliver the seeds into a seed tube 54 at a uniform rate. Seed tube 54 defines a conduit having an outlet end immediately downstream of opener shoe 44 and upstream of seed trench closer discs 46. Seed tube 54 thus receives seeds from metering assembly 52 and defines a substantially vertical passage through which the seeds are delivered into the seed trench, and preferably the trench formed by opener shoe 44. The components of seed metering assembly 52 are further described in U.S. Pat. No. 6,109,193, the disclosure of which is hereby incorporated by reference.

During operation, as the power source or tractor pulls the tool bar 22 across and over the ground, the seed trench opening assembly 38 opens a seed trench 45 in the ground. The depth of the seed trench is controlled by the relative vertical distance between the gauge wheels 43 and opener discs 40. Seeds from the hopper 50 flow into the seed metering assembly 52 in bulk and are subsequently deposited into the seed trench via seed delivery tube 54 at a controlled rate. The seed trench closer discs 46 trail the seed trench opening assembly 38 and, as the seed planting unit 36 is drawn across the field, close the seed trench together and over the seed dispensed by the seed metering assembly 52. The trailing press wheel 48 firms the soil closed over the delivered seeds.

Planting unit 36 can also be equipped with a pesticide hopper 57 that is mounted towards a rear end of the planting unit. Hopper 57 preferably includes an insecticide and is provided with conventional dispensing apparatus for applying controlled amounts of insecticide where desired in combination with the planting of seeds by each planting unit 36.

Referring again to FIG. 1, each planting unit 36 can be coupled to an air moving system 76 that includes one or more air moving units (collectively identified as 78) enclosed in one or more housings (collectively identified as 80). While air mover unit(s) 78 are configured to provide negative pressure, they can alternatively function as blower units if a positive pressure seed metering assembly is implemented in planting units 36. Air moving system 76 includes a lower lateral tubing member 82 that is connected at its middle to one of the air moving units 78, and extends laterally outwardly therefrom in both directions. A plurality of openings (not shown) are formed in tubing member 82 that connect to a forward end of a corresponding plurality of flexible intake tubes that, in turn, connect with the corresponding metering assembly 52.

A bifurcated arrangement is illustrated with respect to a pair of upper lateral tubing members 84 that are connected at their laterally inner ends to one or more air mover units 78. Tubing members 84 extend parallel to, and are disposed above, tubing member 82, and are connected at their outer ends to outer tubing members 86. Outer tubing members 86 are vertically aligned with lower tubing member 82, and extend across those planting units 36 that are disposed laterally outwardly with respect to lower tubing member 82. A plurality of openings (not shown) are formed in tubing members 86 that connect to a plurality of flexible intake tubes that, in turn, connect with the metering assemblies 52 of laterally outwardly disposed planting units 36.

During operation, air moving units 78 draw air through the metering assemblies 52 of all planting units 36 to which the lateral tubes 82–86 are operably connected. The number of air mover units 78 implemented in a given seed planting assembly depends largely on the number of planting units 36 and the airflow rating of each air mover unit.

Referring now to FIGS. 2 and 3, planting unit frame 37 includes a central longitudinally extending column 72 that houses a tension bar 74 that extends generally along the entire length of column 72. Tension bar 74 includes a cylindrical member 92 extending forwardly from the rearward end 88 of column 72. Member 92 is threadedly connected to rearward end 88. The forward end of member 92 is rotatably connected to a plate 93 which is, in turn, connected to a pair of laterally spaced parallel links 94 that flank seed delivery tube 54, and are connected at their forward ends to a rectangular housing 96 which extends longitudinally forwardly of column 72. Housing 96 is connected at its forward end to a cylindrical member 98, which defines the forward end of tension bar 74. Cylindrical member 98 defines a threaded forward end 101 that is inserted into a threaded aperture 100 that extends longitudinally through a rectangular plate 102 to provide a terminal stop (See also FIG. 4).

A depth adjustment knob 90 extends rearwardly from the rearward end 88 of column 72, and is attached to tension bar 74. Accordingly, depth adjustment knob 90 can be actuated clockwise and counterclockwise to translate all components of tension bar 74 forwardly and rearwardly, respectively, as will be described in more detail below. Longitudinal translation of tension bar 74 adjusts the depth of seed trench 45. Knob 90 can be actuated manually, or alternatively can be connected to an actuator that is controlled electronically from within the tractor or other towing implement. The present invention contemplates several alternative geometric variations of tension bar 74 that enables forward and rearward translation. For instance, knob 90 could alternatively be positioned at the forward end 39 of planting unit frame 37.

Referring to FIG. 3 in particular, planting unit 36 includes an automatic down pressure assembly 104 for automatically adjusting the down pressure acting against frame 37 as the planting unit travels between areas of different ground hardness during operation. In particular, assembly 104 includes a valve 110 that is actuated by forward and rearward movement of upper gauge wheel arm ends 66. Valve 110 includes a port 107 (see FIG. 4) that is connected to a compressed air source 111 (such as an air compressor or charged air reservoir) via a conduit 113. Valve 110 further includes a second port 109 that is connected to a spring member 114 via a conduit 115. Air source 111 is preferably centrally mounted onto tool bar 22, and provides forced air to one or more row units 36. Alternatively, air source 111 could be provided by the air braking system of the tractor (not shown) that tows planting assembly 20 during operation. Spring member 114 is fastened to a mounting bracket 116, which extends upwardly from mounting structure 55. It should thus be appreciated that spring member 114 is connected to, and grounded at, tool bar 22. However, the present invention envisions alternative constructions for connecting spring member 114 to tool bar 22, either directly or indirectly. The present invention further contemplates that source 111 can alternatively provide any fluid capable of inflating and deflating spring member 114, as appreciated by one having ordinary skill in the art.

Spring member 114 defines a bottom surface 117 that is connected to a downwardly extending piston 118. Piston 118, in turn, is pivotally connected to lower link 63 at a lower piston end 120. Piston 118 is further connected to upper link 61 at a location between lower end 120 and bottom surface 117. In particular, a pair of apertures 122 and 124 extends laterally through links 61 and 63, respectively. A pin or other suitable fastener extends through apertures 122 and 124, along with mating apertures (not shown) extending through piston 118. Spring member 114 is mounted to bracket 116 in such a way to allow bottom surface 117 to translate vertically downwardly and upwardly as the pressure inside spring member 114 increases and decreases, respectively. Spring member 114 is thus also referred to herein as a fluid spring, as the internal spring pressure is varied as fluid is delivered to, and removed from, the spring member.

Figure 4:
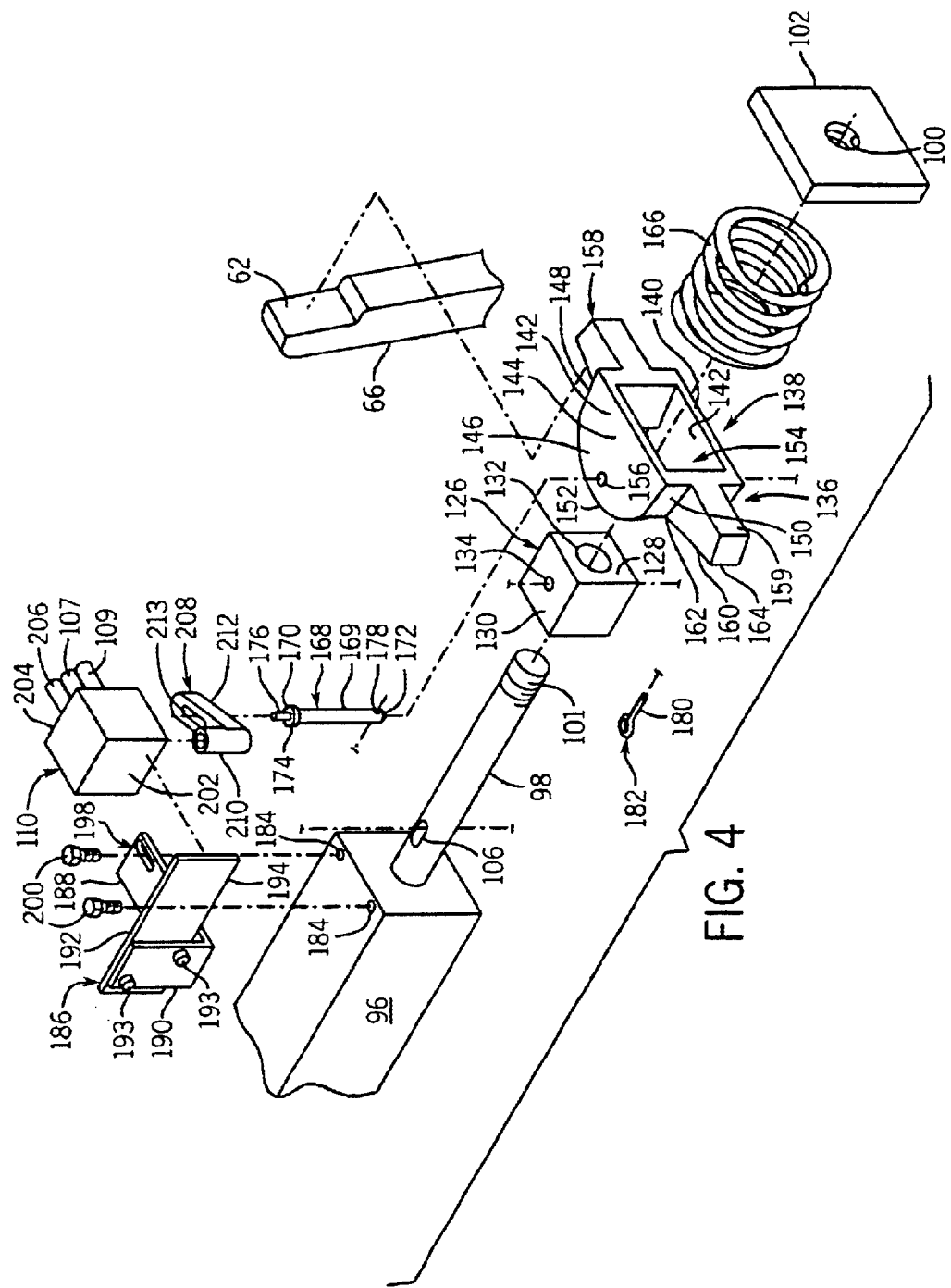
FIG. 4 is an assembly view of components of the down pressure assembly illustrated in FIG. 3.
Figure 5:
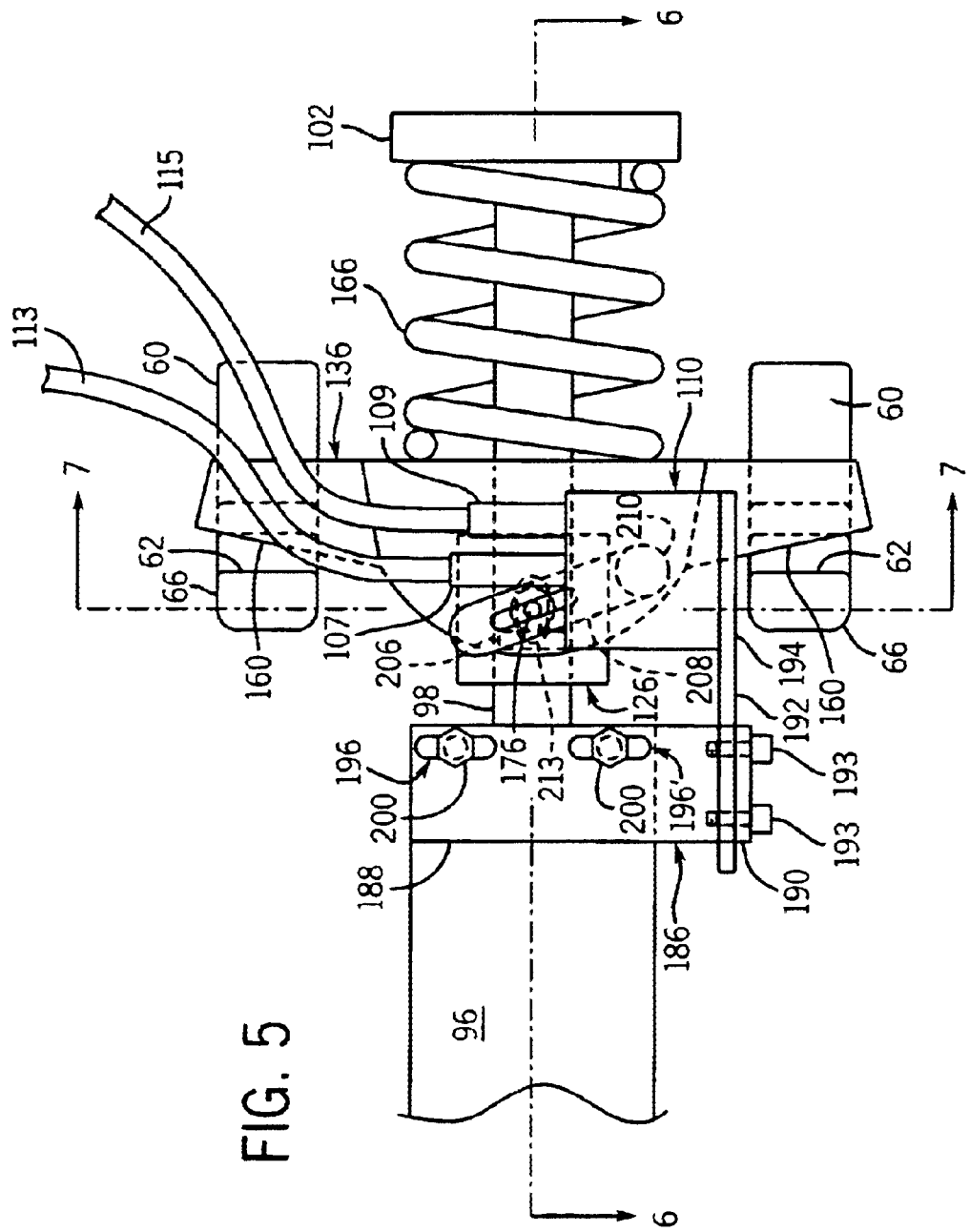
FIG. 5 is a top plan view of the assembled down pressure assembly illustrated in FIG. 4.

Referring now to FIG. 4 in particular, a longitudinally elongated groove 106 extends vertically through cylindrical member 98 at a location proximal housing 96. A square housing 126 defines a pair of longitudinally opposing end walls 128 and opposing upper and lower walls 130. An aperture 132 extends longitudinally through end walls 128, and defines a diameter that is larger than the diameter of cylindrical member 98. Housing 126 further defines an aperture 134 extending vertically through upper and lower walls 130. Aperture 134 has a diameter that is less than the lateral thickness of elongated groove 106.

A wobble bracket 136 includes a central hub 138 that defines a laterally extending front end wall 140. Opposing upper and lower walls 142 extend rearwardly from end wall 140, and include a forward rectangular section 144 integrally connected to a rearwardly disposed arced section 146. A side wall 148 extends along the periphery of walls 142 to join opposing laterally outer ends of end wall 140. Side wall 148 thus also defines opposing rectangular portions 150 and an arced portion 152 connecting rectangular portions 150. Arced portion 152 provides a convex surface with respect to the longitudinally rearward end of bracket 136.

A void 154 having a rectangular cross-section extends longitudinally through front end wall 140 and arced side wall 152. Void 154 is sized to loosely receive housing 126. A cylindrical aperture 156 extends vertically through the arced sections 136 of upper and lower walls 142. Aperture 156 has a diameter substantially equal to the diameter of aperture 134. A pair of wings 158 extends laterally outwardly from rectangular portions 150 of side wall 148. Each wing 158 includes a leading edge 159 that extends laterally outwardly from side wall 148. A trailing edge 160 is disposed rearwardly from leading edge 159, and is angled forwardly from a first end 162 proximal side wall 148 to a distal end 164.

A coil spring 166 extends rearwardly from plate 102. Spring 166 has an outer diameter sized to abut front end wall 140.

Referring now also to FIGS. 5–8, down pressure assembly 104 is assembled by at least partially inserting housing 126 into void 154 through arced portion 152 of side wall 148, such that end walls 128 extend parallel to front end wall 140 and perpendicular to rectangular sections 150 of side wall 148. Housing 126 is inserted until aperture 134 is in alignment with aperture 156. Housing 126 is then mounted onto cylindrical member 98 by sliding the housing 126 rearwardly such that front end 101 extends through aperture 132 formed in rear wall 128. Housing 126 is further slid rearwardly along cylindrical member 98 until apertures 134 and 156 are aligned with groove 106.

A pin 168 is provided including a cylindrical shaft 169 that defines an upper end 170 and a lower end 172, and has a diameter slightly less than the diameter of apertures 134 and 156. Pin includes an annular shoulder 174 extending radially outwardly from upper end 170. The outer diameter of shoulder 174 is greater than the diameter of apertures 134 and 156. An arm 176 extends vertically upwardly from upper end 170, and thus extends upwardly beyond shoulder 174. A keyhole 178 extends radially through lower end 172, and is sized to receive the shaft end 180 of a key 182.

During installation, the lower end 172 of pin 168 is inserted through aperture 156 in upper wall 142, and subsequently through aperture 134 in upper wall 130. Pin 168 is slid downwardly until lower end extends through groove 106, and apertures 134 and 156 in lower walls 130 and 142, respectively, until key hole 178 emerges from lower wall 142. Shoulder 174 abuts upper wall 142 to prevent pin 168 from being inserted completely through bracket 136. Shaft 180 is then inserted into key hole 178 to lock the pin 168 in position. Shaft 180 may be locked in keyhole 178 by any method known in the art. The permissible longitudinal travel of wobble bracket 136 is limited by the longitudinal length of groove 106.

Void 154 is sized larger than housing 126 by a predetermined amount so as to enable bracket 136 to pivot clockwise and counterclockwise about pin 168. In accordance with the preferred embodiment, bracket 136 is permitted to pivot 35° equally back and forth (for a total travel of 70°), though any angle of travel between 0° and 180° is contemplated by the present invention. For instance, referring to FIGS. 8 and 9, during operation on level terrain, both upper ends 66 exert the same force on trailing edges 160, thereby preventing rotation of wobble bracket 136. However, when one of the gauge wheels 43 (the right gauge wheel 43 as illustrated) travels over an area that is elevated with respect to the terrain under the opposing gauge wheel, the corresponding upper end 66 will translate forwardly, and the opposing upper end 66 will translate rearwardly, as described above. The motion of right upper end 66 causes bracket 136 to rotate counterclockwise in the direction of Arrow A. The opposing force of left upper end 66 reduces the relative vertical translation of gauge wheels 43, and furthermore prevents actuation of valve 110 in response to the forward motion of only one upper end 66.

Spring 166 is then slid rearwardly over the forward end 101 of cylindrical member 98 until the rear face of spring 166 abuts front face 140. Plate 102 is then threadedly inserted onto the forward end 101 of cylindrical member 98 by rotating plate 102 in a clockwise direction (taken from a rearward view of plate 102). Plate 102 is inserted until the forward end of spring 166 engages plate 102, and the rearward end of spring 166 engages forward end wall 128. Plate is then continuously inserted until spring 166 is sufficiently compressed. It should thus be appreciated that spring 166 resists forward translation of bracket 136.

Each gauge wheel arm 56 is laterally and vertically aligned with wings 136. The upper end 66 of each gauge wheel arm 56 extends substantially vertically upwardly, and defines a flat surface 62 that is recessed and configured to abut trailing edge 160 of each wing. Accordingly, as a given gauge wheel 43 is raised and lowered relative to the opposite gauge wheel 43 during operation, for instance as planting unit 36 travels over uneven terrain, the corresponding upper end 66 will travel forwardly and rearwardly with respect to the opposite upper end 66. The upper end movement forces wobble bracket 136 to pivot about pin 168. The angular compliance of bracket 136 reduces the seed trench depth variance during a planting operation. Furthermore, upward translation of gauge wheels 43 relative to frame 37 is permitted, though resisted, by spring 66, which directly resists forward translation of bracket 136. Downward translation of gauge wheels 43 relative to frame 37 biases surfaces 62 rearwardly away from trailing edges 160, thereby allowing spring 166 to bias wobble bracket 136 rearwardly against surfaces 62.

As described above, depth adjustment knob 90 is rotatable clockwise or counterclockwise to translate cylindrical member 98 towards or away from front 39 of frame 37. When member 98 is translated towards the front 39 of frame 37, wobble bracket 136 is biased towards spring 166, thereby enabling gauge wheel arm ends 66 to translate forwardly, thereby raising gauge wheels 43. When gauge wheels 43 are raised, seed trench firming point 42 is lowered relative to the gauge wheels, which increases the depth of seed trench 45. Likewise, when member 98 is translated away from the front end 39 of frame 37, the spring force biases bracket 136 rearwardly, thereby lowering the gauge wheels 43 and raising the seed trench forming point 42 relative to the gauge wheels which, in turn, decreases the depth of seed trench 45. Once set, the seed trench has a desired depth D1 when the gauge wheels 43 ride along the ground under a predefined vertical force (down pressure) that maintains ground contact, but is not excessive so as to force gauge wheels 43 into the ground and unnecessarily compact the soil adjacent the seed trench 45.

Figure 6:
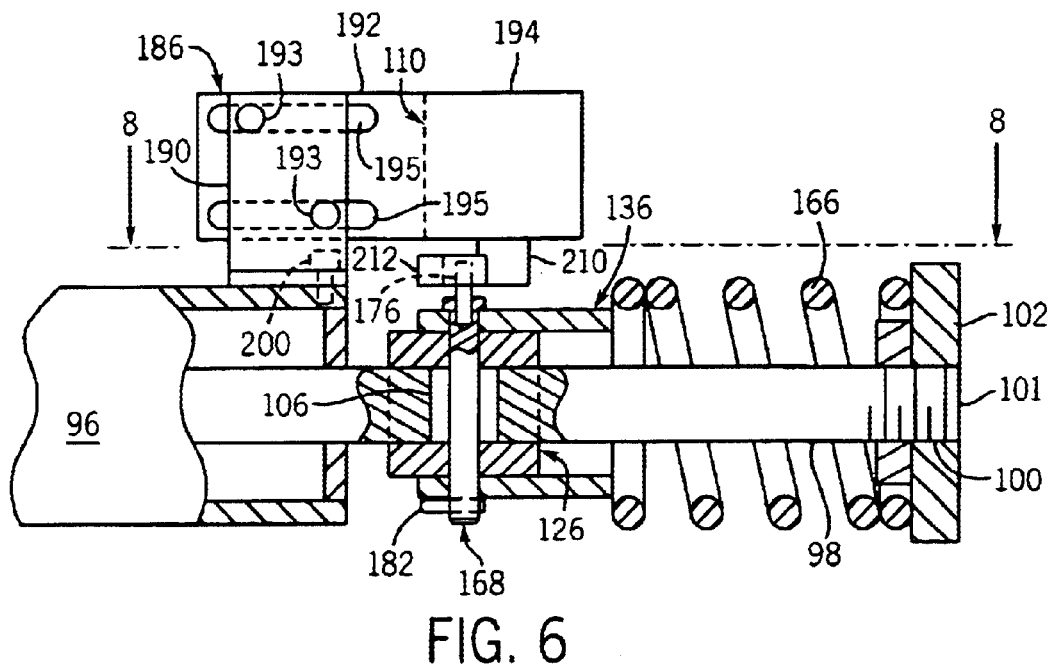
FIG. 6 is a sectional side elevation view of the down pressure assembly taken through line 6—6 of FIG. 5.
Figure 7:
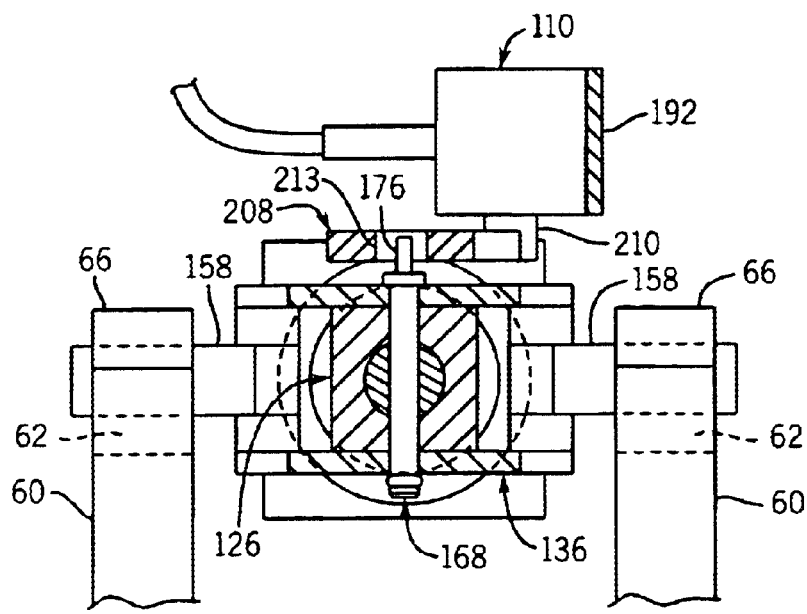
FIG. 7 is a sectional side elevation view of the down pressure assembly taken through line 7—7 of FIG. 5.

A pair of laterally spaced apertures 184 extend vertically downwardly into the front end of housing 96. Apertures 184 are laterally spaced so as to be positioned at opposite lateral ends of housing 96. A valve mounting bracket 186 is provided having a base 188 that extends laterally in a horizontal orientation. Base 188 is integrally connected to a side wall 190 that extends vertically upwardly from one lateral end of base 188. A support wall 192 is also provided that extends forwardly in a vertical orientation, and is connected at its rearward end to side wall 190 via screws 193. A portion 194 of support wall 192 thus extends forwardly with respect to base 188. Referring to FIG. 6, screws 193 can be mounted in any position along corresponding longitudinally extending slots 195 that are formed in support wall 192. The longitudinal position of bracket 186 (and hence valve 101) is thus adjustable, thereby enabling a user to preset the down pressure applied to frame 37 and gauge wheels 43, as will be described in more detail below.

Referring again to FIGS. 5–8, the lateral position of bracket 186 (and hence valve 101) is also adjustable. In particular, a first elongated slot 196 extends through base 188 and are positioned proximal the front edge of base 188 at the laterally outer edge that is opposite side wall 190. A second elongated slot 196' is disposed proximal the front end of base 188 (forwardly aligned with slot 96) and is disposed proximal side wall 190. The two slots are displaced from each other a distance equal to the distance between apertures 184. A pair of screws 200 are provided that can be inserted through slots 196 and 196' and threadedly inserted into apertures 184. Accordingly, the lateral position of bracket 186 is adjustable by mounted the bracket in any position accommodated by slots 196 and 196'.

Valve 110 includes a first proximal side wall 202 that is mounted onto the laterally inner surface of side wall 190 by any suitable attachment mechanism. A second distal side wall 204 is disposed opposite side wall 202. Conduits 113 and 115 extend outwardly from side wall 202 and connect to air source 111 and spring 114, as described above, along with an outlet 206 to the ambient environment.

A valve arm 208 is provided having a cylindrical neck 210 that extends upwardly from a horizontal arm 212. Neck 210 extends into the bottom of valve 110 such that arm 212 extends horizontally outwardly from neck 210 below valve 110. A horizontally elongated groove 213 extends vertically through arm 212, and is sized to receive arm 176 of pin 168. When valve 110 is installed on mounting bracket 186, and when bracket 186 is mounted onto housing 96, arm 176 extends laterally outwardly from neck 210 in a direction opposite side wall 190. Arm 176 is translated longitudinally forwards and backwards during operation, thereby causing valve arm 212 to pivot clockwise and counterclockwise, respectively, (from a downward view) about neck 210 during operation to control fluid flow through valve 110, as will be described in more detail below.

Valve 110 is a variable flow valve, and can be of the type described in U.S. Pat. No. 4,726,571, the disclosure of which is hereby incorporated by reference as if set forth in its entirety herein. Alternatively, a skilled artisan will appreciate that valve 110 can be of any suitable construction capable of operating as described herein. In a first mode, when valve arm 208 is in a neutral, pivotally centered position, flow in and out of ports 113 and 115 is blocked. Accordingly, when the valve is connected to source 111 and spring 114 in the manner described above, flow from source 111 is blocked from travelling to spring 114, and air in spring 114 is prevented from flowing through valve 110 and into the ambient environment through outlet 206.

In a second mode, when valve arm 208 is rotated clockwise (from a view looking down), port 107 continues to be blocked, but port 109 is coupled to outlet 206. Accordingly, air is permitted to flow from spring 114 into the ambient environment via outlet 206. It should be appreciated that removing air from spring 114 reduces the spring pressure, and correspondingly reduces the downward force (down pressure) that spring 114 exerts on frame 37. Because valve 110 is a variable flow valve, the flow rate of air through the valve 110 from spring 114 will increase as arm 208 is pivoted clockwise.

In a third mode, when valve arm 208 is rotated counterclockwise (from a view looking down) from the neutral position, port 109 is blocked, but port 107 is linked to port 109, thereby permitting air to flow from source 111 through valve 110 and into spring 114. It should be appreciated that increasing airflow into the spring 114 increases the spring pressure, and correspondingly increases the downward force that spring 114 exerts on frame 37. Because valve 110 is a variable flow valve, the flow rate of air travelling from source 111, through valve 110, and to spring 114 will increase as arm 208 is pivoted counterclockwise.

As described above, the position of bracket 186 (and hence valve 110) is adjustable in the lateral direction. For instance, when bracket 186 is mounted in the innermost lateral position (i.e., screws 200 are disposed towards wall 192), arm 176 engages groove 213 at a location proximal neck 210. The location of arm 176 engagement with groove 213 moves laterally away from neck 210 as bracket 186 is mounted in positions laterally outwardly from the innermost lateral position. It should be appreciated that longitudinal translation of pin 168 will cause arm 212 to pivot increasingly as pin 176 engages groove 213 at locations closer to neck 210. Accordingly, valve 10 is most sensitive when mounted in the innermost lateral position described above, and becomes less sensitive as bracket 186 is mounted at positions laterally outwardly from that position. The sensitivity of the automatic pressure system is therefore advantageously adjustable, as will be appreciated from the description below. Because valve 110 is a variable flow valve, the flow rate of air from source 111 to spring 114 will increase as arm 208 is pivoted counterclockwise.

Also as discussed above, the position of bracket 186 (and hence valve 110) is adjustable in the longitudinal direction. As a result, once knob 90 is actuated to determined the desired seed trench depth, the desired down pressure can be pre-determined. In particular, as bracket 186 is mounted in a longitudinally forward position relative to pin 168, valve arm 208 will pivot counterclockwise, thus allowing air to flow from source 111 to spring 114 and increasing the down pressure on frame 37. Conversely, as bracket 186 is mounted in a longitudinally rearward position relative to pin 168, valve arm will pivot clockwise, thus allowing air to flow from spring 114 and decreasing the down pressure.

As discussed above with reference to FIG. 2, it is desirable to maintain the down pressure acting against frame 37 at the predetermined desired level that produces a consistent seed trench 45 having the desired depth D1. The desired trench depth D1 is achieved by providing a down pressure against gauge wheels 43 that is sufficient to ensure that the wheels ride along the ground, thus properly gauging the trench depth, without compacting adjacent soil.

Figure 10:
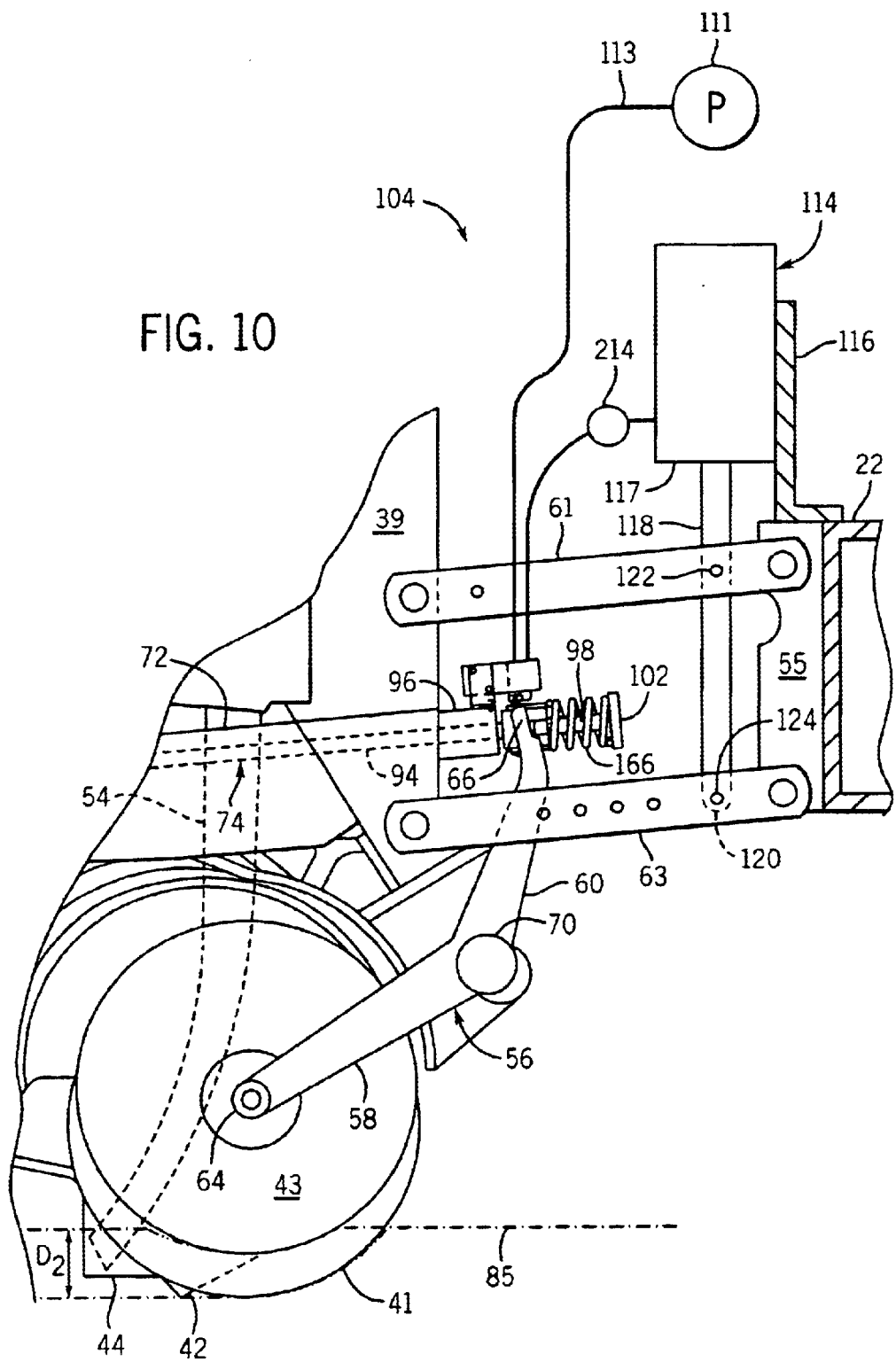
FIG. 10 is a side elevation view of the planting unit similar to that of FIG. 3, but with the seed trench opener discs producing a seed trench having a greater depth than desired.

However, referring now to FIG. 10, when planting unit 36 travels into softer terrain or when the planting unit travel speed is decreased, the preset down pressure will be excessive, thus causing opener discs 40 and gauge wheels 43 to sink into the ground 85. Gauge wheels 43 thus undesirably compact the ground 85 adjacent the seed trench 45 when operating in this position. Furthermore, the resulting trench 45 has a depth D2 that is greater than the desired depth D1. Less down pressure is desired in this situation. Because the upward vertical forces that the ground 85 imparts on the opener discs 40 will decrease in this situation, the upward forces acting on the gauge wheels 43 will increase.

Figure 11:
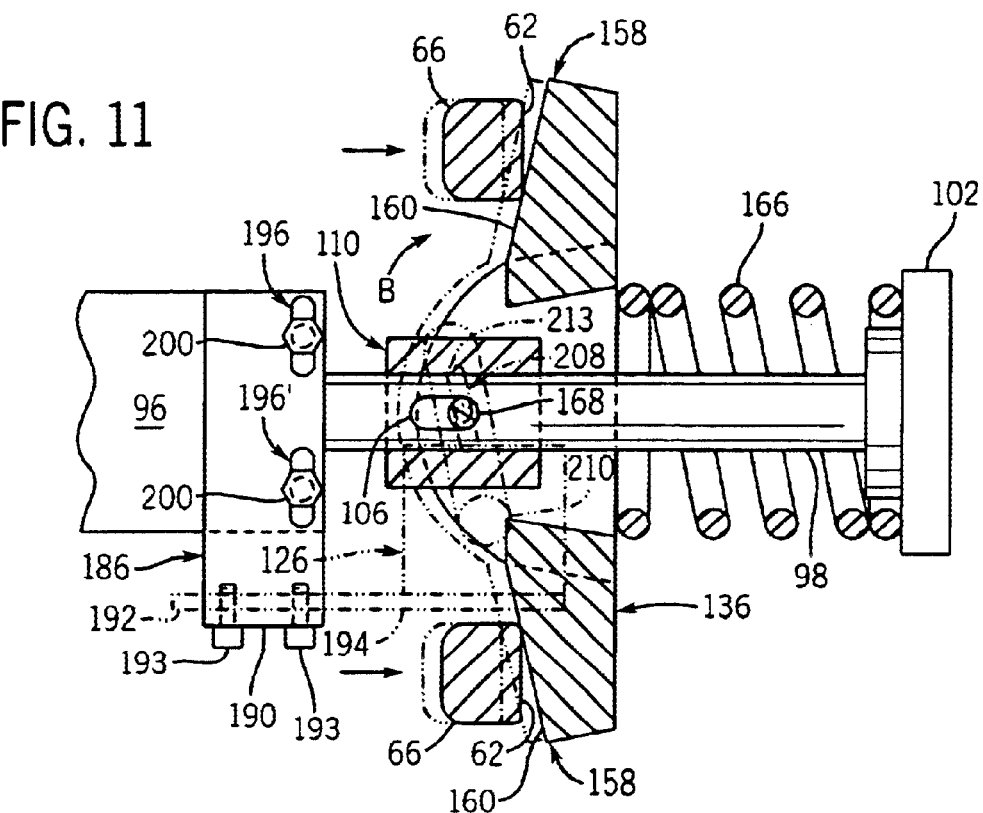
FIG. 11 is a sectional elevation view similar to FIG. 8, but positioned when the seed trench has a greater depth than desired, as illustrated in FIG. 10.

Referring also to FIG. 11, as the upward forces on the gauge wheels 43 increase, the upper ends 66 of their corresponding gauge wheel arms 56 (and thus pin 168) are translated longitudinally forward, thereby rotating valve arm 208 clockwise in the direction of Arrow B. As arm 208 is rotated clockwise, air flows from spring 114 into the ambient environment via outlet 206. As air is removed from spring 114, the downward spring force is reduced, thereby reducing the down pressure applied to frame 37 (and hence gauge wheels) by spring 114.

As the down pressure against frame 37 is reduced, opener discs 40 and gauge wheels 43 begin to rise within the ground 85, thus causing upper ends 66 to translate rearwardly. Valve arm 208 thus pivots counterclockwise towards the neutral position, causing a reduction in the air flowing out of the spring 114. Once the discs 40 and gauge wheels 43 rise to a position such that seed trench 45 has a depth D1, the valve arm 208 will be in the neutral position, and the down pressure will be maintained.

Figure 13:
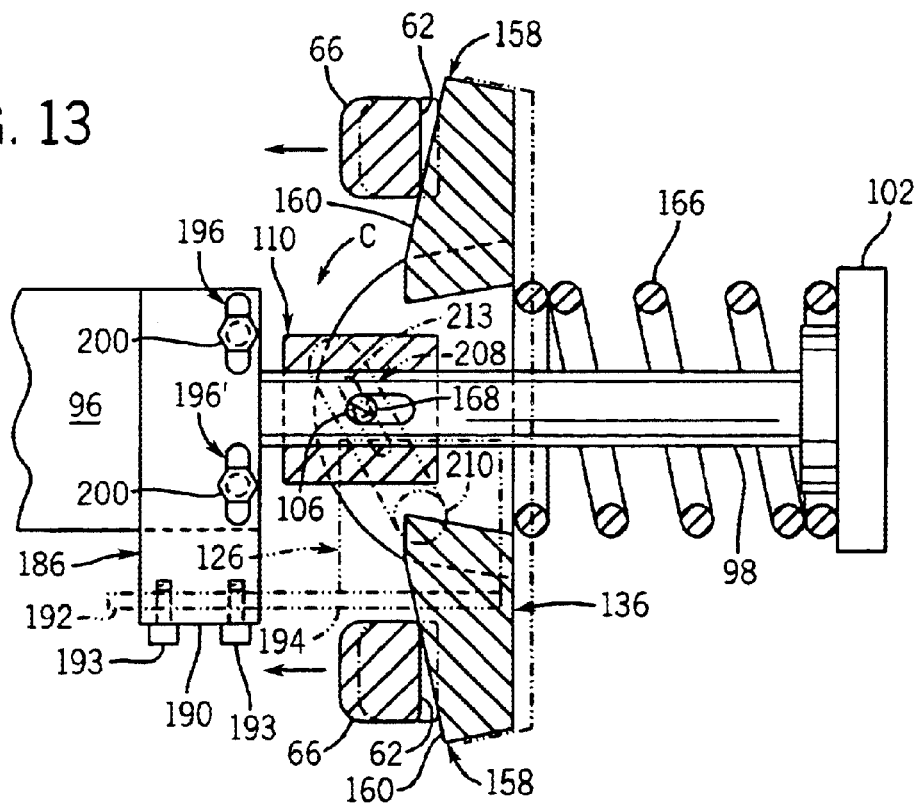
FIG. 13 is a sectional elevation view similar to FIG. 8, but positioned when the seed trench has a depth less than desired, as illustrated in FIG. 12.
Figure 12:
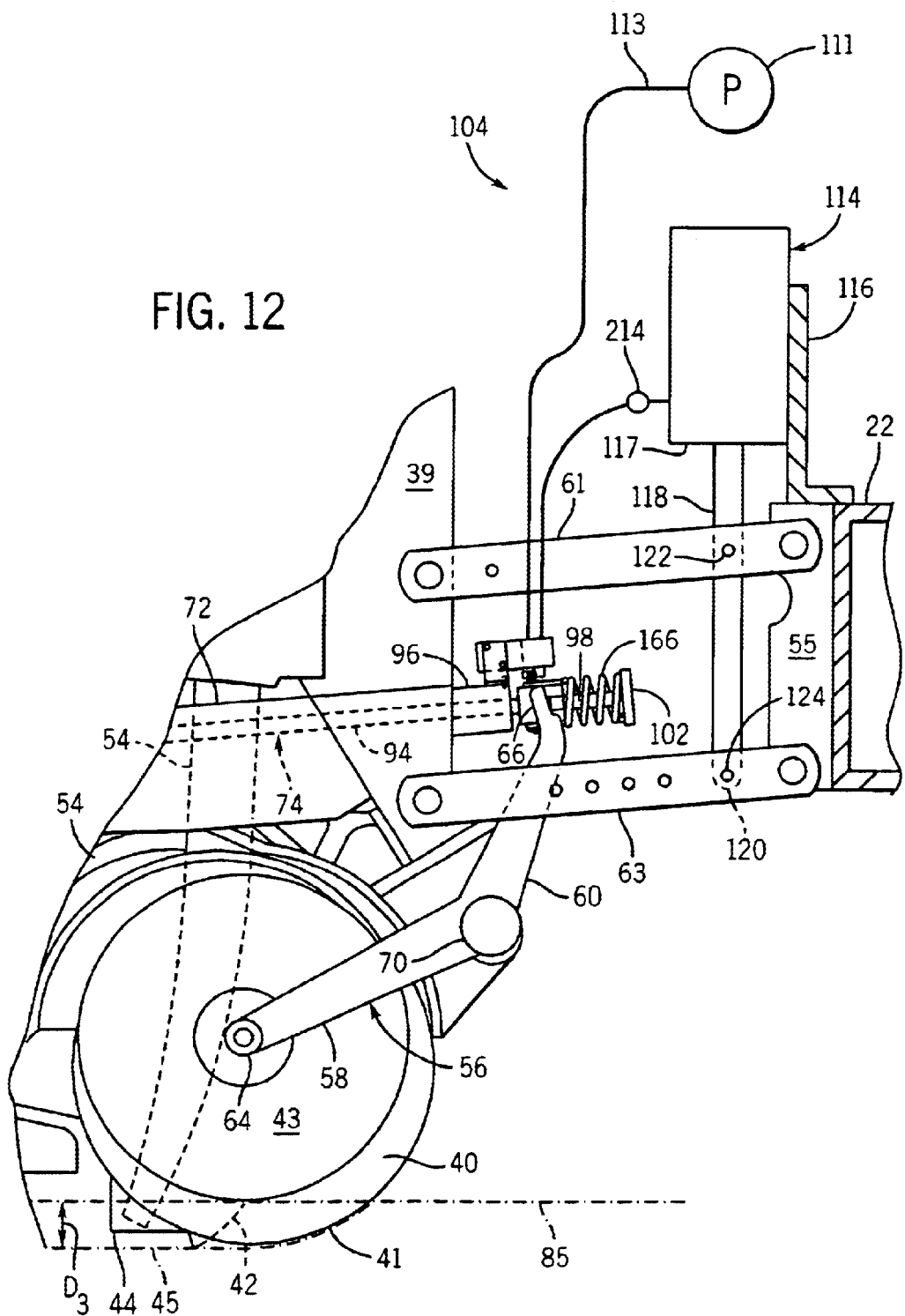
FIG. 12 is a side elevation view of the planting unit similar to that of FIG. 3, but with the seed trench opener discs producing a seed trench having a depth that is less than desired.

Referring now to FIGS. 12 and 13, when planting unit 36 travels over hard terrain, or travels at faster speeds, opener discs 40 will tend to rise within the ground, thereby causing the planting unit 36 and gauge wheels 43 to rise as well. The trench depth D3 is thus less than the desired depth D1 in this situation. As a result, increased down pressure is required to ensure that the proper trench depth gauging by gauge wheels 43. Gauge wheels 43, which constantly ride along the ground 85 under the force of spring 166, are lowered relative to planting unit frame 37 in this situation, thereby causing the upper ends 66 of corresponding gauge wheel arms 56 (and pin 168) to translate longitudinally rearwardly under the force of spring 98.

Rearward translation of pin 168 within groove 106 causes valve arm 208 to rotate counterclockwise in the direction of Arrow C, thereby coupling ports 113 and 115 and allowing air to flow from source 111 to spring 114. The increased air pressure within spring 114 biases piston 118 downwardly, thereby increasing the down pressure on frame 37. As the down pressure increases, opener discs 40 and gauge wheels 43 will be forced further into the ground, thereby increasing the depth of seed trench 45. The upper ends 66 will thus translate forwardly and valve arm 208 will rotate clockwise towards the neutral position. As arm 208 rotates clockwise, valve 110 will cause the air flow from source 111 to spring 140 to decrease, thereby slowing the rate of opener disc and gauge wheel descent as the seed trench depth D3 approaches the desired depth D1. Air flow to and from spring 140 will be blocked once the desired down pressure is applied to the frame (and gauge wheels 43), thereby achieving the desired seed trench depth. The valve arm 108 will be in the neutral position based on the previous setting.

It should be appreciated that while the gauge wheels 43 provide a depth regulating member in accordance with the preferred embodiment, the present invention contemplates that any suitable alternative depth regulating member, for example a skid or plate or the like, that is capable of riding along the ground 85 to regulate trench depth is contemplated by the present invention.

The present invention further recognizes that it may be desirable to regulate the maximum air pressure in spring 114 in order to prevent overpressurization of the spring and subsequent failure. Accordingly, a pressure relief valve 214 can be disposed in conduit 15 proximal spring 114 that redirects air from valve 10 to the ambient environment when the pressure within spring exceeds a predetermined threshold. Pressure relief valves of this type are well known to those having ordinary skill in the art.

Advantageously, valve 110 can include an internal delay system that prevents the valve from changing modes for a predetermined period of tirne. Accordingly, down pressure on the frame is not adjusted until the seed trench depth has deviated from the desired depth for the period of time. The delay prevents abrupt changes in down pressure when, for instance, the planting unit 36 travels along the ground of a given consistency that changes only momentarily before returning to the ground consistency prior to the momentary change.

Referring now to FIG. 14, the present invention recognizes that down pressure assembly 104 can alternatively be replaced by an automatic up pressure assembly 216. Assembly 216 includes the same components of down pressure assembly but in a reverse orientation. For instance, spring 114 is supported by toolbar 22 in an orientation such that piston 118 extends upwardly from the surface 117, and engages arms 61 and 63. Accordingly, when spring 114 is inflated, spring 114 forces the planting unit frame 37 upwards. Operation of valve 10 is also reversed in this embodiment, as appreciated by one having ordinary skill in the art. Accordingly, forward motion of gauge wheel arm ends 66 (in response to discs 40 creating a seed trench having a greater depth than desired) causes valve 110 to enable air to flow from source 111 into spring 114, thereby increasing the up pressure and lifting discs 40 further out of the ground to reduce the seed trench depth. Likewise, when the seed trench 45 is not sufficiently deep, valve will enable air to flow out of spring 114, thereby decreasing the up pressure on frame 37. It should be appreciated in this embodiment that the weight of planting unit 36 should be sufficient such that, even when no up pressure is applied, the seed trench 45 is at least as deep as the desired depth even in areas of hard terrain and high speed. It should further be appreciated that the embodiment illustrated in FIGS. 1–13 could be configured to provide up pressure when spring 114 is configured to provide a double acting cylinder that provides both down pressure and up pressure.

It should be appreciated that the present invention advantageously enables a user to perform planting operations at various speeds and over various terrain while maintaining a constant desired seed trench depth without having to manually adjust the down pressure on the planting unit.

The above has been described as a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A seed planting assembly comprising:
   a laterally extending support member;
   a planting unit including a planting unit frame supported by the support member, wherein the planting unit frame carries:
   i. a seed trench opening assembly operable to create a seed trench in a ground surface;
   ii. a seed delivery assembly delivering seeds into the seed trench;
   iii. a seed trench closing assembly operable to close the seed trench;
   iv. a depth regulating member having a vertical position relative to the seed trench opening assembly, wherein the depth regulating member experiences an actual vertical force that controls ground surface engagement; and
   a spring supported by the support member and connected to the planting unit, wherein the spring provides a variable spring force against the frame in response to variations in internal spring pressure;
   a pressurized fluid source operable to provide fluid to the spring; and
   a valve linking the fluid source to the spring, wherein the valve is in mechanical communication with the seed trench opening assembly and enables fluid flow in and out of the spring to correspondingly adjust the spring force when the actual vertical force differs from a desired vertical force.

2. The seed planting assembly as recited in claim 1, wherein the fluid source is a compressed air source for delivering air to the spring.

3. The seed planting assembly as recited in claim 2, wherein the valve includes an outlet to ambient environment for removing air from the spring.

4. The seed planting assembly as recited in claim 3, wherein the valve controls air flow rate.

5. The seed planting assembly as recited in claim 1, wherein the valve enables fluid to flow into the spring when the actual vertical force is less than the desired vertical force.

6. The seed planting assembly as recited in claim 1, wherein the valve enables fluid to flow from the spring when the actual vertical force is greater than the desired vertical force.

7. The seed planting assembly as recited in claim 1, wherein the depth regulating member comprises a first gauge wheel operable to ride along the ground surface.

8. The seed planting assembly as recited in claim 7, wherein valve has a valve arm having a valve arm position that adjusts fluid flow through the valve.

9. The seed planting assembly as recited in claim 8, wherein the gauge wheel is supported by a gauge wheel arm having an outer end having a position that corresponds to the actual vertical force.

10. The seed planting assembly as recited in claim 9, wherein the outer end of the gauge wheel arm communicates with the valve arm at an engagement location.

11. The seed planting assembly as recited in claim 10, wherein the valve is mountable on the depth regulating member in multiple positions that vary the engagement location.

12. The seed planting assembly as recited in claim 11, wherein varying the engagement location along the valve arm changes valve arm movement in response changes in the actual vertical force.

13. The seed planting assembly as recited in claim 11, wherein the engagement location is adjustable a direction substantially transverse to valve arm extension to predetermine an initial vertical force applied to the gauge wheel.

14. The seed planting assembly as recited in claim 12, wherein the valve arm moves pivotally in response to movement of the outer end.

15. The seed planting assembly as recited in claim 8, wherein the seed trench opening assembly comprises a second gauge wheel operable to ride along the ground surface.

16. The seed planting assembly as recited in claim 15, wherein the first and second gauge wheels are supported by first and second gauge wheel arms, respectively, wherein each gauge wheel arm defines an outer end having a position that corresponds to the actual vertical force.

17. The seed planting assembly as recited in claim 16, further comprising a bracket connected to the planting unit frame so as to translate relative to the frame and pivot about a pivot axis, wherein the outer ends of the gauge wheel arms engage the bracket at opposite sides of the pivot axis.

18. The seed planting assembly as recited in claim 17, wherein a linkage connects the bracket and the valve arm.

19. The seed planting assembly as recited in claim 18, wherein the valve includes a delay that enables fluid to flow to and from the air spring after a predetermined amount of time in response to valve arm movement.

20. The seed planting assembly as recited in claim 18, wherein a spring is coupled to the planting unit flame at one and, and coupled to the bracket at a second end to bias the bracket against the outer ends.

21. The seed planting assembly as recited in claim 1, wherein the spring force acts upwardly on the planting unit frame in a direction away from the seed trench.

22. A method comprising:
   A) providing a planting unit including a planting unit frame supported by a support member, wherein the planting unit frame carries:
   i. a seed trench opening assembly operable to create a seed trench in a ground surface;
   ii. a seed delivery assembly delivering seeds into the seed trench;
   iii. a seed trench closing assembly operable to close the seed trench; and
   iv. a depth regulating member having a vertical position relative to the seed trench opening assembly, wherein the depth regulating member experiences an actual vertical force that controls ground surface engagement;
   B) coupling a spring between the support member and the planting unit frame, wherein the spring is operable to increase and decrease a spring force against the frame in response to variations in internal spring pressure;

C) providing a force fluid source for delivering fluid to the spring;

D) connecting a valve between the spring and fluid source, and

E) actuating the valve to control fluid to and from the spring when the actual vertical force differs from a desired vertical force.

23. The method as recited in claim 22, further comprising coupling the valve to a compressed air source for delivering air to the air spring.

24. The method as recited in claim 22, wherein step (E) further comprises controlling fluid flow direction and flow rate.

25. The method as recited in claim 22, wherein step (E) further comprises adjusting the spring force, wherein the spring force biases the planting unit frame downwardly in a direction towards the seed trench.

26. The method as recited in claim 25, wherein step (E) further comprises drawing fluid out of the spring when the actual vertical force is greater than the desired vertical force.

27. The method as recited in claim 22, wherein the seed trench opening assembly comprises first and second gauge wheels, each of which having a position relative to the seed trench forming member.

28. The method as recited in claim 27, further comprising supporting the first and second gauge wheels by first and second gauge wheel arms, respectively, wherein each gauge wheel arm defines an outer end having a position that corresponds to the actual vertical force.

29. The method as recited in claim 28, further comprising mounting a bracket onto depth regulating member of the planting unit frame, wherein the bracket translates relative to the frame and pivots about a pivot axis, and wherein the outer ends of the gauge wheel arms engage the bracket at opposite sides of the pivot axis.

30. The seed planting assembly as recited in claim 29, further comprising connecting an arm between the bracket and the valve, wherein bracket translation actuates the valve.

31. The method as recited in claim 30, further comprising biasing the bracket in a direction against the outer ends.

32. The method as recited in claim 22, wherein the spring force acts upwardly on the planting unit frame in a direction away from the seed trench.

* * * * *